Patented Oct. 7, 1930

1,777,975

UNITED STATES PATENT OFFICE

WILHELM KLEPSCH, OF AUSSIG-ON-THE-ELBE, CZECHOSLOVAKIA

METHOD OF MAKING MOLDS

No Drawing. Application filed September 15, 1927, Serial No. 219,799, and in Czechoslovakia and Germany June 29, 1926.

This invention relates to a method of treating the surfaces of bodies or articles composed of iron in order to protect them from deterioration by fire, by chemical action, such as corrosion by acids or alkalies or by mechanical influences.

It is known that iron, which contains 0 to 2.6% of carbon can only be melted and cast with difficulty, iron of such a composition having the property of retaining its shape at high temperatures as it has a high melting point. As a general rule iron containing from 0 to 2.6% of carbon is much more capable of resisting fire, acids and alkalies than iron containing more than 2.6% of carbon and is also more capable of resisting mechanical influences. The above-mentioned advantageous properties are moreover exhibited particularly by iron containing 1.4% to 2.6% of carbon.

With the object, therefore, of protecting bodies or articles composed of iron from various deteriorating influences, the invention takes advantage of the properties of iron containing 0 to 2.6% of carbon and according to the present invention a layer of iron of suitable thickness which contains 0 to 2.6% or 1.4% to 2.6% of carbon is produced on the surface of the body or article by reducing the amount of carbon of such bodies or articles by decarbonization.

According to my invention the molds in which the cast bodies or articles are to be produced are prepared by means of a solid substance or substances, which owing to the heat of the material to be cast when poured into the mold, or to glowing of the cast material in the mold after casting together with the material of the mold, decarbonize the surface of the cast body or article to a suitable depth so that the body or article is provided with a protective layer of iron containing 0% to 2.6% of carbon. If the cast piece to be treated is to be subjected to great heat during subsequent use, it is preferable to arrange for the protective layer to contain 1.4% to 2.6% of carbon.

A substantial improvement in the protective properties of the protective layer is attained if the iron which is to be provided with such a layer contains, according to a further feature of the invention, the following elements separately or mixed: for example, aluminium, chromium, cobalt, boron, copper, magnesium, manganese, molybdenum, nickel, silicon, titanium, vanadium, tungsten. The mold is prepared with solid materials by painting, spraying or by effecting an intimate or layer-like mixture with the molding material with or without the use of binding media.

The preparation of the mold with a solid decarbonizing material by painting or spraying may be effected by mixing the said material intimately with a fluid, such as water, so as to form a uniform suspension and applying this suspension to the inner surface of the molds by painting or spraying.

I am aware that it has already been proposed to run molten iron on steel in molds with a decarbonizing lining, but in such cases the molding material was not mixed with a decarbonizing substance as is done with my process.

I claim:

1. A method of making a mold for casting bodies of iron with a layer of appropriate thickness containing 0% to 2.6% of carbon and imparting thereby to such bodies an improved resistance against fire, acids and alkalies, which method consists in preparing a mold with a mixture of ordinary molding material such as sand with a solid decarbonizing substance.

2. A method of making a mold for casting bodies of iron with a layer of appropriate thickness containing 0% to 2.6% of carbon and imparting thereby to such bodies an improved resistance against fire, acids and alkalies, which method consists in preparing the mold with a mixture of ordinary molding material such as sand with a solid decarbonizing substance and thereafter applying a decarbonizing solid substance to the inner surface of said mold.

3. A method of making a mold for casting bodies of iron with a layer of appropriate thickness containing 0% to 2.6% of carbon and imparting thereby to such bodies an improved resistance against fire, acids and alkalies, which method consists in preparing the mold with a mixture of ordinary molding material such as sand with a solid decarbonizing substance, and thereafter applying a decarbonizing solid substance mixed intimately with a liquid so as to form a uniform suspension to the inner surface of the said mold.

In testimony whereof I affix my signature.

WILHELM KLEPSCH.